(12) United States Patent
Chang

(10) Patent No.: US 8,710,751 B2
(45) Date of Patent: Apr. 29, 2014

(54) LED STRING WITH A CAPABILITY TO MAINTAIN A CURRENT PATH AND LED UNIT THEREOF

(75) Inventor: Chucheng Chang, Hsinchu (TW)

(73) Assignee: Polestar Electric Industries Co., Ltd., Tingyuan Management District, Guangdong Jiangmen (CN)

( * ) Notice: Subject to any disclaimer, the term of this patent is extended or adjusted under 35 U.S.C. 154(b) by 117 days.

(21) Appl. No.: 13/558,861

(22) Filed: Jul. 26, 2012

(65) Prior Publication Data
US 2014/0028201 A1  Jan. 30, 2014

(51) Int. Cl.
*H05B 37/02* (2006.01)
(52) U.S. Cl.
USPC ........................................ 315/185 R; 315/248
(58) Field of Classification Search
None
See application file for complete search history.

(56) References Cited

U.S. PATENT DOCUMENTS

| | | | | |
|---|---|---|---|---|
| 6,137,237 | A * | 10/2000 | MacLennan et al. | 315/248 |
| 6,313,587 | B1 * | 11/2001 | MacLennan et al. | 315/248 |
| 6,424,099 | B1 * | 7/2002 | Kirkpatrick et al. | 315/248 |
| 6,949,887 | B2 * | 9/2005 | Kirkpatrick et al. | 315/248 |
| 2002/0167282 | A1 * | 11/2002 | Kirkpatrick et al. | 315/248 |
| 2012/0032813 | A1 * | 2/2012 | Chen | 340/649 |

* cited by examiner

*Primary Examiner* — Crystal L Hammond
(74) *Attorney, Agent, or Firm* — Abe Hershkovitz; Hershkovitz & Associates, PLLC

(57) ABSTRACT

An LED string with a capability to maintain a current path has multiple LED units electrically connected in series. Each of the LED units has a base, a holder, a bridge device, a cover and an LED device. The base has two conductive pads. The holder and the cover are mounted in the base. The bridge device is mounted in the holder. The LED device is mounted in the cover. The bridge device and the LED device are electrically connected in parallel and contact the conductive pads. When the LED device is damaged, the bridge device still contacts the conductive pads. Hence, the bridge device provides a path that allows a current to flow through the conductive pads.

14 Claims, 5 Drawing Sheets

LED STRING WITH A CAPABILITY TO MAINTAIN A CURRENT PATH AND LED UNIT THEREOF

BACKGROUND OF THE INVENTION

1. Field of the Invention

The present invention relates an LED string, and more particularly to an LED string with a capability to maintain a current path and an LED unit thereof.

2. Description of Related Art

A light emitting diode (LED) string mainly comprises multiple LED devices electrically connected in series. When the LED string connects to a power source, the power source and the LED string form a current path, so that the LED devices are activated by a working voltage and a current generated from the power source.

However, when one of the LED devices is damaged, such damaged LED device substantially forms an open circuit, and the current path is interrupted by the damaged LED device. Hence, the LED string cannot receive the working voltage and the current from the power source. All of the LED devices will be extinguished. The damaged LED device causes the whole LED string to be functionless. The LED string cannot be activated until the current path is restored.

SUMMARY OF THE INVENTION

An objective of the present invention is to provide an LED string with a capability to maintain a current path and an LED unit thereof. Although one of the LED devices is damaged, the current path still exists. Whether one or some of the LED devices is/are damaged, other LED devices are still activated.

The LED string in accordance with the present invention comprises multiple LED units electrically connected in series. Each of the LED units comprises a base, a holder, a bridge device, a cover and an LED device.

The base has an inner space with a top opening and two conductive pads mounted in the inner space of the base.

The holder is mounted in the inner space of the base and has a space.

The bridge device is mounted in the space of the holder and has two pins respectively extending through the holder to electrically contact the conductive pads of the base.

The cover is mounted in the top opening of the base and has an aperture.

The LED device is mounted in the aperture of the cover and has two pins respectively extending through the cover to electrically contact the conductive pads of the base.

The LED unit in accordance with the present invention comprises a base, a holder, a bridge device, a cover and an LED device.

The base has an inner space with a top opening and two conductive pads mounted in the inner space of the base.

The holder is mounted in the inner space of the base and has a space.

The bridge device is mounted in the space of the holder and has two pins respectively extending through the holder to electrically contact the conductive pads of the base.

The cover is mounted in the top opening of the base and has an aperture.

The LED device is mounted in the aperture of the cover and has two pins respectively extending through the cover to electrically contact the conductive pads of the base.

The conductive pads contact the pins of the bridge device and the pins of the LED device. Hence, the bridge device is electrically connected to the LED device in parallel. When the LED string in accordance with the present invention is electrically connected to a power source, the power source and the LED string form a current path. The power source can provide a working voltage and a working current to activate the LED string.

If at least one LED device is damaged, such damaged LED device will form an open circuit. Hence, the working current is blocked from flowing through the damaged LED device. Even so, the bridge device still contacts the conductive pads to be a connection intermediate between the conductive pads. The working current can flow through the bridge device. Therefore, the current path is not interrupted. Other LED devices can be normally activated instead of being extinguished at a same time. The LED string is still workable even though any one of the LED devices is damaged.

DETAILED DESCRIPTION OF THE PREFERRED EMBODIMENT

Figure 1:
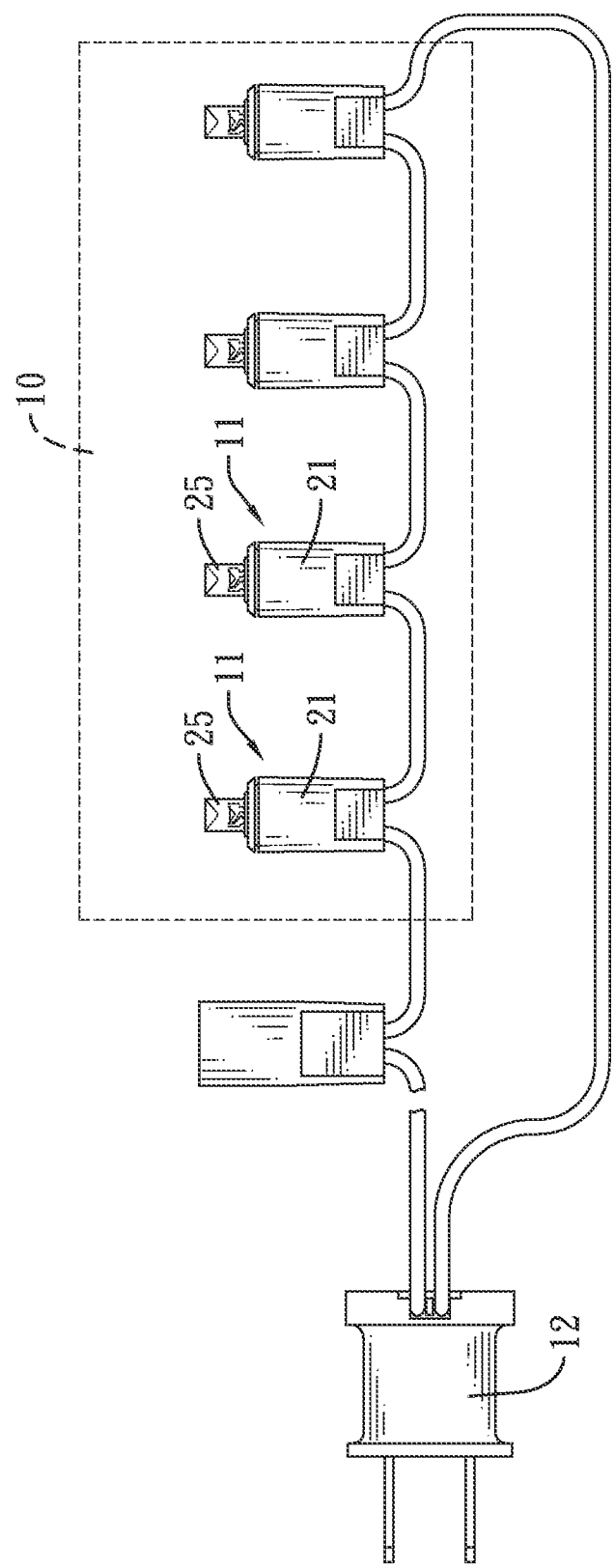
FIG. 1 is a planer view of an LED string in accordance with the present invention.

With reference to FIG. 1, an LED string 10 in accordance with the present invention comprises multiple LED units 11 electrically connected in series. The LED string 10 is adapted to electrically connect to a plug 12. When the plug 12 connects to a power source, the power source provides a working voltage and a working current to activate the LED string 10.

Figure 2:
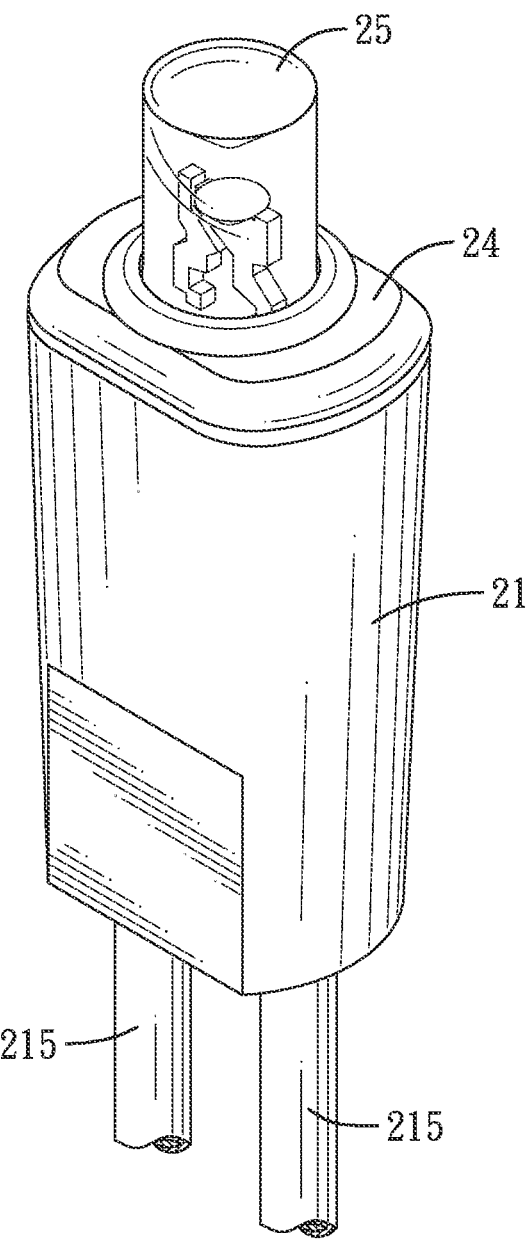
FIG. 2 is a perspective view of an LED unit in accordance with the present invention.
Figure 3:
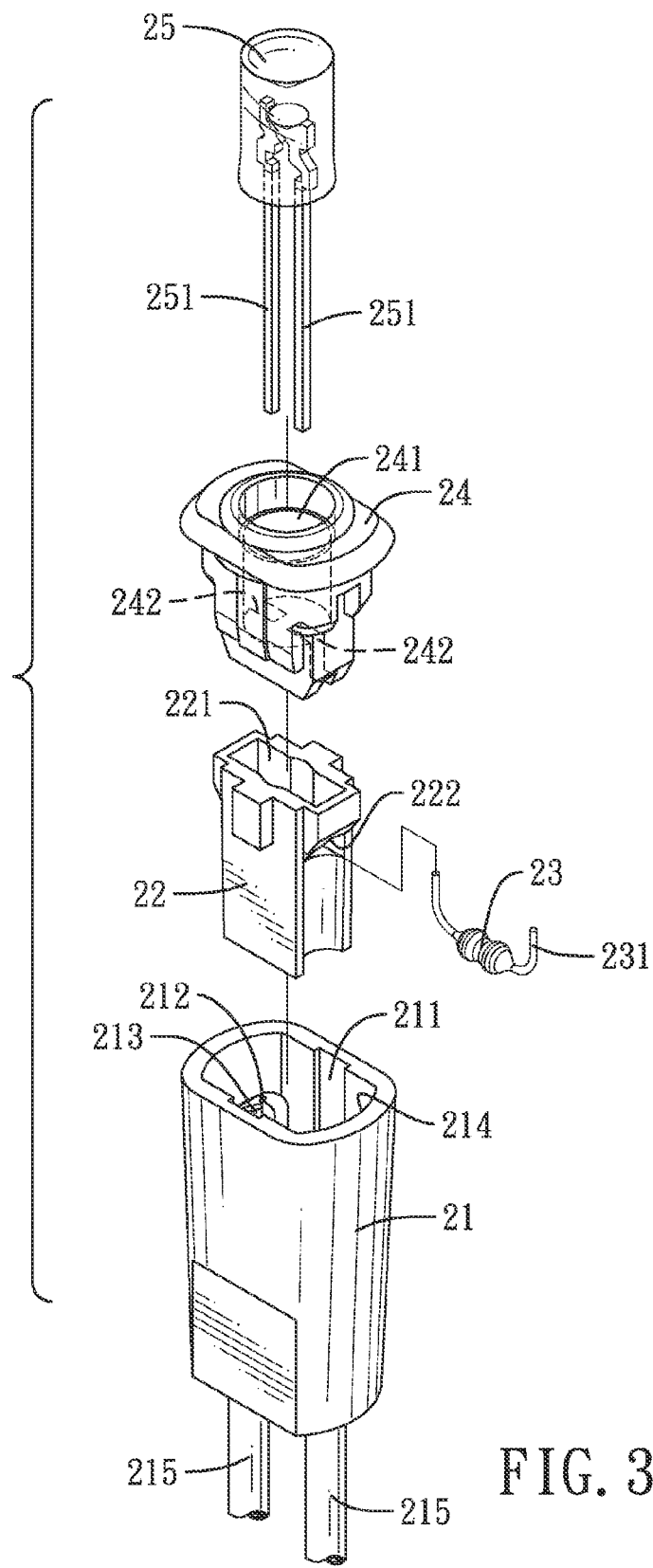
FIG. 3 is an exploded view of the LED unit in accordance with the present invention.
Figure 4:
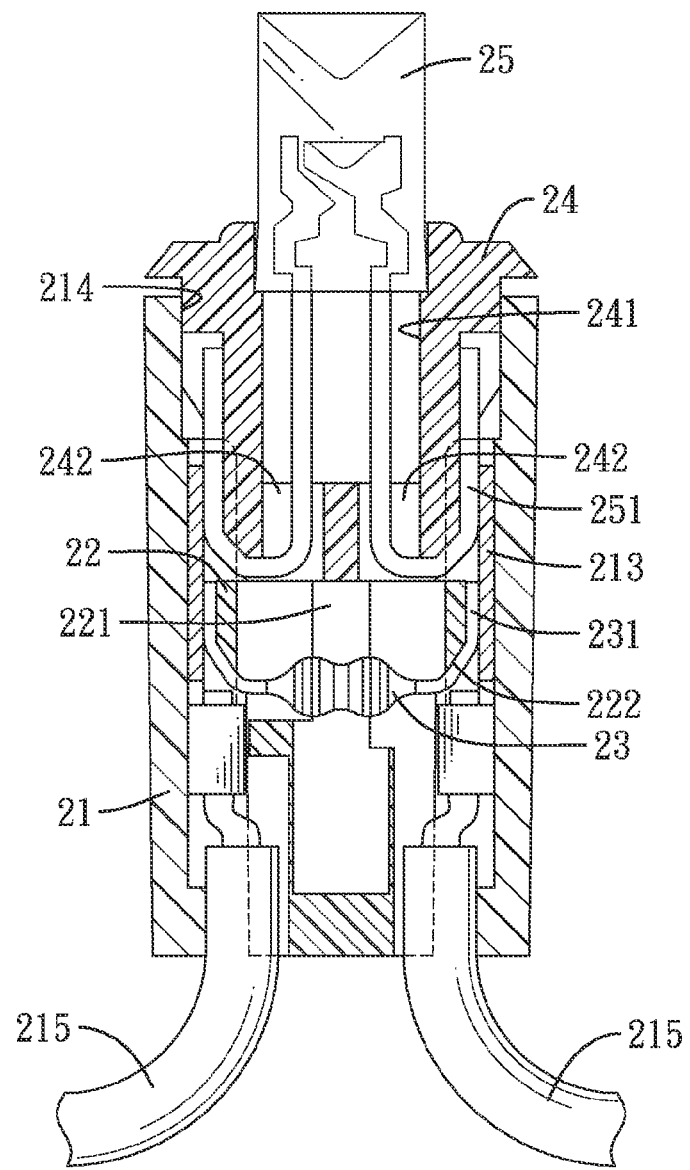
FIG. 4 is a cross-sectional view of the LED unit in accordance with the present invention.

With reference to FIGS. 2-4, each of the LED units 11 comprises a base 21, a holder 22, a bridge device 23, a cover 24 and an LED device 25.

The base 21 has a top, an inner space 211, two grooves 212 and two conductive pads 213. The inner space 211 has a top opening 214 formed in the top of the base 21. The grooves 212 are oppositely formed in the inner space 211. The conductive pads 213 are respectively mounted in the grooves 212 and are adapted to electrically connect to wires 215. The wires 215 are respectively connected to the conductive pads 213 of the other LED units 11.

The holder 22 is mounted in the inner space 211 of the base 21 and has a space 221 and two holes 222. The space 221 is formed in the holder 22. The holes 222 are laterally and oppositely formed through the holder 22 and communicate with the space 221.

The bridge device 23 is an electric device, such as a resistor, a thermistor, a voltage dependent resistor (VDR) or a voltage regulator diode. Such resistors acts as a current path of the LED string 10. The voltage regulator diode acts as a voltage regulation device for the LED device 25. The bridge device 23 is mounted in the space 221 of the holder 22 and has two pins 231 respectively contacting the conductive pads 213 of the base 21. In this embodiment, the pins 231 of the bridge device 23 extend through the holes 222 of the holder 22 and are bent upward to touch the conductive pads 213 and tightly pressed between the holder 22 and the conductive pads 213.

The cover 24 is mounted in the top opening 214 of the base 21 and has a top, a bottom, an aperture 241 and two holes 242. The aperture 241 is formed in the top of cover 24. The two holes 242 are formed in the bottom of the cover 24 and communicate with the aperture 241.

The LED device 25 is mounted in the aperture 241 of the cover 24 and has two pins 251 respectively contacting the conductive pads 213. The pins 251 of the LED device 25 extend through the holes 242 of the cover 24 and are bent upward to touch the conductive pads 213 and tightly pressed between the cover 24 and the conductive pads 213. Hence, the LED device 25 is electrically connected to the bridge device 23 in parallel.

Figure 5A:
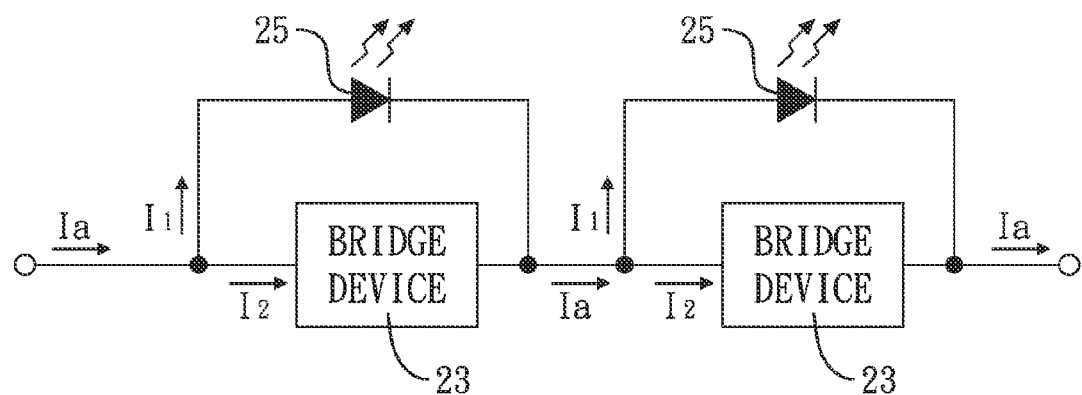
FIG. 5A is a block diagram of a LED string.
Figure 5B:
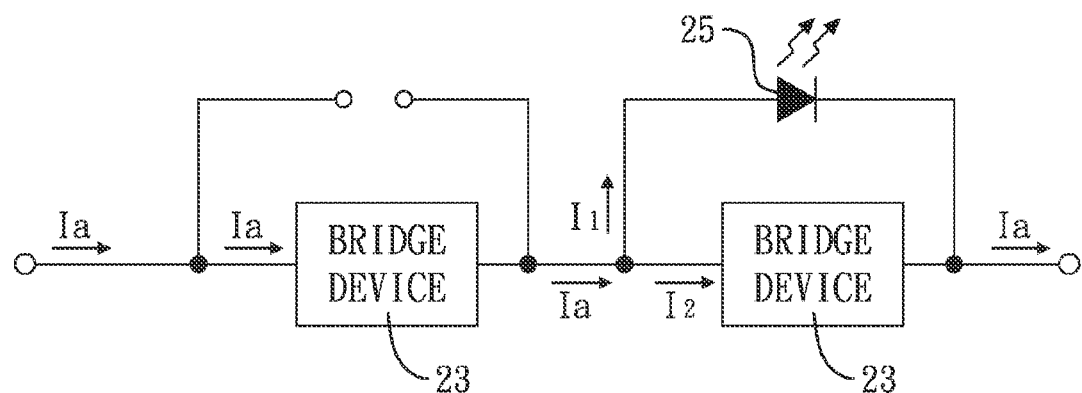
FIG. 5B is a block diagram of a LED string with a damaged LED unit.

With reference to FIGS. 1 and 5A, when the plug 12 connects to a power source, the power source and the LED string 10 in accordance with the present invention form a current path. The power source provides a working voltage and a working current Ia to the LED string 10. Assuming the LED devices 25 respectively have a same impedance, and the bridge devices 23 respectively have a same impedance, when the working current Ia flows through the LED units, the working current Ia is divided into a first current I1 and a second current I2. The first current I1 flows through the LED device 25 to activate the LED device 25. The bridge device 23 provides a path that allows the second current I2 to pass by.

With reference to 5B, even any one of the LED devices 25 is damaged and substantially forms an open circuit, the working current Ia still flows through the bridge device 23. With reference to FIG. 4, the bridge device 23 acts as a connection intermediate between the two conductive pads 213 of the LED unit 11 and maintains the current path. The damaged LED device 25 does not interrupt the current path. Therefore, other LED units 11 are still activated and are not affected by the damaged LED unit 11.

In addition, because the damaged LED device 25 is extinguished and other LED devices 25 are normally activated and shining meanwhile, a user can easily recognize the damaged LED device 25 and replace the damaged LED device 25 with a new one. It is convenient to check whether the LED devices 25 work normally or not.

What is claimed is:

1. An LED string with a capability to maintain a connecting state comprising multiple LED units electrically connected in series, each of the LED units comprising:
   a base having:
      an inner space with a top opening; and
      two conductive pads mounted in the inner space of the base;
   a holder mounted in the inner space of the base and having a space;
   a bridge device mounted in the space of the holder and having two pins respectively extending through the holder to electrically contact the conductive pads of the base;
   a cover mounted in the top opening of the base and having an aperture; and
   an LED device mounted in the aperture of the cover and having two pins respectively extending through the cover to electrically contact the conductive pads of the base.

2. The LED string as claimed in claim 1, wherein
   the base has two grooves formed in the inner space; and
   the conductive pads are respectively mounted in the grooves.

3. The LED string as claimed in claim 2, wherein
   the holder has two holes laterally and oppositely formed through the holder and communicating with the space of the holder; and
   the pins of the bridge device respectively extend through the two holes of the holder and touch the conductive pads.

4. The LED string as claimed in claim 3, wherein
   the cover has two holes communicating with the aperture; and
   the pins of the LED device respectively extend through the two holes of the cover and touch the conductive pads.

5. The LED string as claimed in claim 4, wherein the bridge device is a thermistor.

6. The LED string as claimed in claim 4, wherein the bridge device is a voltage dependent resistor.

7. The LED string as claimed in claim 4, wherein the bridge device is a voltage regulator diode.

8. An LED unit comprising:
   a base having:
      an inner space with a top opening; and
      two conductive pads mounted in the inner space of the base;
   a holder mounted in the inner space of the base and having a space;
   a bridge device mounted in the space of the holder and having two pins respectively extending through the holder to electrically contact the conductive pads of the base;
   a cover mounted in the top opening of the base and having an aperture; and
   an LED device mounted in the aperture of the cover and having two pins respectively extending through the cover to electrically contact the conductive pads of the base.

9. The LED unit as claimed in claim 8, wherein
   the base has two grooves formed in the inner space; and
   the conductive pads are respectively mounted in the grooves.

10. The LED unit as claimed in claim 9, wherein
    the holder has two holes laterally and oppositely formed through the holder and communicating with the space of the holder; and
    the pins of the bridge device respectively extend through the two holes of the holder and touch the conductive pads.

11. The LED unit as claimed in claim 10, wherein
    the cover has two holes communicating with the aperture; and
    the pins of the LED device respectively extend through the two holes of the cover and touch the conductive pads.

12. The LED unit as claimed in claim 11, wherein the bridge device is a thermistor.

13. The LED unit as claimed in claim 11, wherein the bridge device is a voltage dependent resistor.

14. The LED unit as claimed in claim 11, wherein the bridge device is a voltage regulator diode.

* * * * *